(12) United States Patent
Shintani et al.

(10) Patent No.: US 9,706,254 B2
(45) Date of Patent: *Jul. 11, 2017

(54) ACOUSTIC SIGNALLING TO SWITCH FROM INFRASTRUCTURE COMMUNICATION MODE TO AD HOC COMMUNICATION MODE

(71) Applicant: Sony Corporation, Tokyo (JP)

(72) Inventors: Peter Shintani, San Diego, CA (US); Koichi Oshima, San Diego, CA (US); Takamichi Mitsuhashi, Tokyo (JP)

(73) Assignee: Sony Corporation, Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 14/482,418

(22) Filed: Sep. 10, 2014

(65) Prior Publication Data

US 2014/0380389 A1 Dec. 25, 2014

Related U.S. Application Data

(63) Continuation of application No. 13/350,335, filed on Jan. 13, 2012, now Pat. No. 8,868,016.

(51) Int. Cl.
| | |
|---|---|
| *H04N 7/173* | (2011.01) |
| *H04N 21/462* | (2011.01) |
| *H04N 21/422* | (2011.01) |
| *H04N 21/4363* | (2011.01) |
| *H04N 21/442* | (2011.01) |
| *H04N 21/61* | (2011.01) |
| *H04W 24/08* | (2009.01) |
| *H04W 84/18* | (2009.01) |
| *H04W 88/06* | (2009.01) |

(52) U.S. Cl.
CPC ... *H04N 21/4622* (2013.01); *H04N 21/42203* (2013.01); *H04N 21/42204* (2013.01); *H04N 21/42221* (2013.01); *H04N 21/42222* (2013.01); *H04N 21/43637* (2013.01); *H04N 21/44227* (2013.01); *H04N 21/6125* (2013.01); *H04W 24/08* (2013.01); *H04W 84/18* (2013.01); *H04W 88/06* (2013.01)

(58) Field of Classification Search
CPC ....... H04N 21/43615; H04N 21/43637; H04N 21/632
See application file for complete search history.

(56) References Cited

U.S. PATENT DOCUMENTS

| | | | |
|---|---|---|---|
| 7,769,370 B2 * | 8/2010 | Du Breuil | G08C 17/02 455/41.1 |
| 2004/0097251 A1 * | 5/2004 | Barilovits | H04W 12/08 455/507 |
| 2005/0164688 A1 | 7/2005 | Satake | |
| 2008/0134278 A1 | 6/2008 | Al-Karmi | |
| 2009/0265470 A1 | 10/2009 | Shen et al. | |
| 2010/0107185 A1 | 4/2010 | Shintani | |

(Continued)

*Primary Examiner* — Gigi L Dubasky
(74) *Attorney, Agent, or Firm* — John L. Rogitz

(57) ABSTRACT

A system includes a first computerized device configured for communicating in an infrastructure mode and an ad hoc mode and a second computerized device configured for communicating at least in the ad hoc mode. A first computerized device operating in infrastructure mode prompts the user of the first computerized device to switch to ad hoc mode in order to communicate with the second computerized device.

23 Claims, 3 Drawing Sheets

(56) References Cited

U.S. PATENT DOCUMENTS

2010/0316043 A1* 12/2010 Doi ................... H04L 27/0006
370/350
2011/0122434 A1* 5/2011 Kim ..................... G06F 3/1203
358/1.15
2011/0261753 A1* 10/2011 Haddad ................ H04L 9/3236
370/328
2012/0072340 A1* 3/2012 Amron .................. G06Q 20/10
705/39

* cited by examiner

ACOUSTIC SIGNALLING TO SWITCH FROM INFRASTRUCTURE COMMUNICATION MODE TO AD HOC COMMUNICATION MODE

FIELD OF THE INVENTION

The present application relates generally to acoustic signaling to switch from an infrastructure communication mode to an ad hoc communication mode.

BACKGROUND OF THE INVENTION

Devices that employ wireless communication, including many modern audio video display devices (AVDD) such as TVs, can communicate using existing communication structure for a variety of tasks. Most simplistically AVDDs communicate with cable head ends over existing cable systems, with satellite receivers over an existing link, and of course with terrestrial broadcast stations over existing broadcast channels. Many AVDDs now also have Internet connectivity, communicating with the Internet using a wireless Internet interface that typically communicates with a wireless access point. In this way the AVDD can download firmware updates from so Internet server, obtain content from the internet, enable a user to browse the Internet, etc.

As understood herein, ad hoc communication systems have become widespread is which typically short-range communication such as but not limited to Bluetooth is used on an ad hoc basis between two devices. Upon mutual detection the two devices can begin communicating on an individualized private short-range communication link. As an example of when ad hoc communication may be employed in a home, a user of a smart phone or camera may wish for the smart phone or camera to send images to the AVDD for display thereon of pictures or videos captured by the smart phone or camera or for playback on the AVDD of audio captured by the smart phone or camera.

As also understood herein, such communication can present issues for the user to overcome, particularly wises the TV is communicating in the infrastructure mode. When this occurs, the user must decide whether to switch the smart or camera to the somewhat more complicated infrastructure mode to communicate with the AVDD, or switch the AVDD to the ad hoc mode, in which case communication of the AVDD in the infrastructure mode may be deleteriously interrupted unless the user is aware of the ongoing communication and takes manual steps to avoid interfering with it.

SUMMARY OF THE INVENTION

According to principles set forth further below, an audio video display device (AVDD) includes a processor, a video display, and computer readable storage medium bearing instructions executable by the processor. Using the instructions stored on the computer readable storage medium, the processor can detect a non-RF signal and can direct the mode of communication to be in either an infrastructure mode or an ad hoc mode. The AVDD also includes an audio sensor, an infrastructure mode communication interface, and an ad hoc mode communication interface.

A second computerized device configured for communicating at least in the ad hoc mode can include a second processor, a second audio signal generator, and a second ad hoc mode communication interface. The second computerized device can send a non-RF signal to the AVDD indicating a request for the AVDD to enter the ad hoc mode to communicate thereby with the second computerized device.

The AVDD may include a TV and the second computerized device can be a wireless telephone or a camera. The ad hoc mode can be a Bluetooth communication mode and the infrastructure mode can use the Internet, although both may use the same physical layer with different software layers.

The non-RF signal may be an acoustic tonal pattern, and the AVDD can enter the ad hoc mode only responsive to a determination that the tonal pattern meets at least one predetermined criterion, which can be a match with a test pattern accessible to the first processor. The non-RF signal may alternatively be an infrared signal or a visible signal and can be sent only in response to a user command to send the audio signal.

The processor of the AVDD, responsive to receiving the non-RF signal, may present a prompt to a user of the AVDD to switch the communication mode from the infrastructure mode to the ad hoc mode. The AVDD can switch to the ad hoc mode in response to a user command to switch communication mode from the infrastructure mode to the ad hoc mode. The non-RF signal may alternatively be sent automatically without user intervention responsive to the second computing device determining that the AVDD is in ad hoc mode proximity to the second computing device.

The processor of the AVDD responsive to receiving the non-RF signal when in the infrastructure mode and, prior to switching to the ad hoc mode, may pause at least one transaction being conducted in the infrastructure mode. The processor of the AVDD may then switch to the ad hoc mode to communicate with the second computing device.

The processor of the AVDD may send an acknowledgement to the second computing device in response to a switch to ad hoc mode. The acknowledgement sent to the second computing device can be either as audio acknowledgement or an RF acknowledgement.

In an alternate embodiment, an audio video display device (AVDD) can include at least one processor, at least one video display controlled by the processor, and at least one microphone detecting audio signals. The processor of the AVDD can be programmed to communicate in an infrastructure mode, receive an audio signal from the microphone while in the infrastructure mode, determine if the audio signal satisfies at least one switch criterion, and switch communication from the infrastructure mode to an ad hoc mode in response to a determination that the audio signal satisfies the switch criterion. Prior to switching communication from the infrastructure mode to the ad hoc mode, the processor of the AVDD may present a user interface (UI) that can include a first selection to switch to the ad hoc mode and a second selection not to switch to the ad hoc mode in response to a determination that the audio signal satisfies the switch criterion. Alternatively, the UI can include a third selection related to current infrastructure mode transactions.

In another embodiment, a mobile device (MD) may include at least one processor configured to communicate in an ad hoc mode and at least one speaker receiving signals generated by the processor and generating an audio signal in response. The processor may be programmed to signal the speaker to generate the audio signal, such as but not limited to a tonal pattern, in response to a determination that a target device is in ad hoc mode proximity to the MD. The tonal pattern can define a period, and hence can be auto-correlated by the target device to improve detection accuracy by facilitating averaging and autocorrelation by the target device. The tonal pattern may be periodic or define a periodic sequence.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
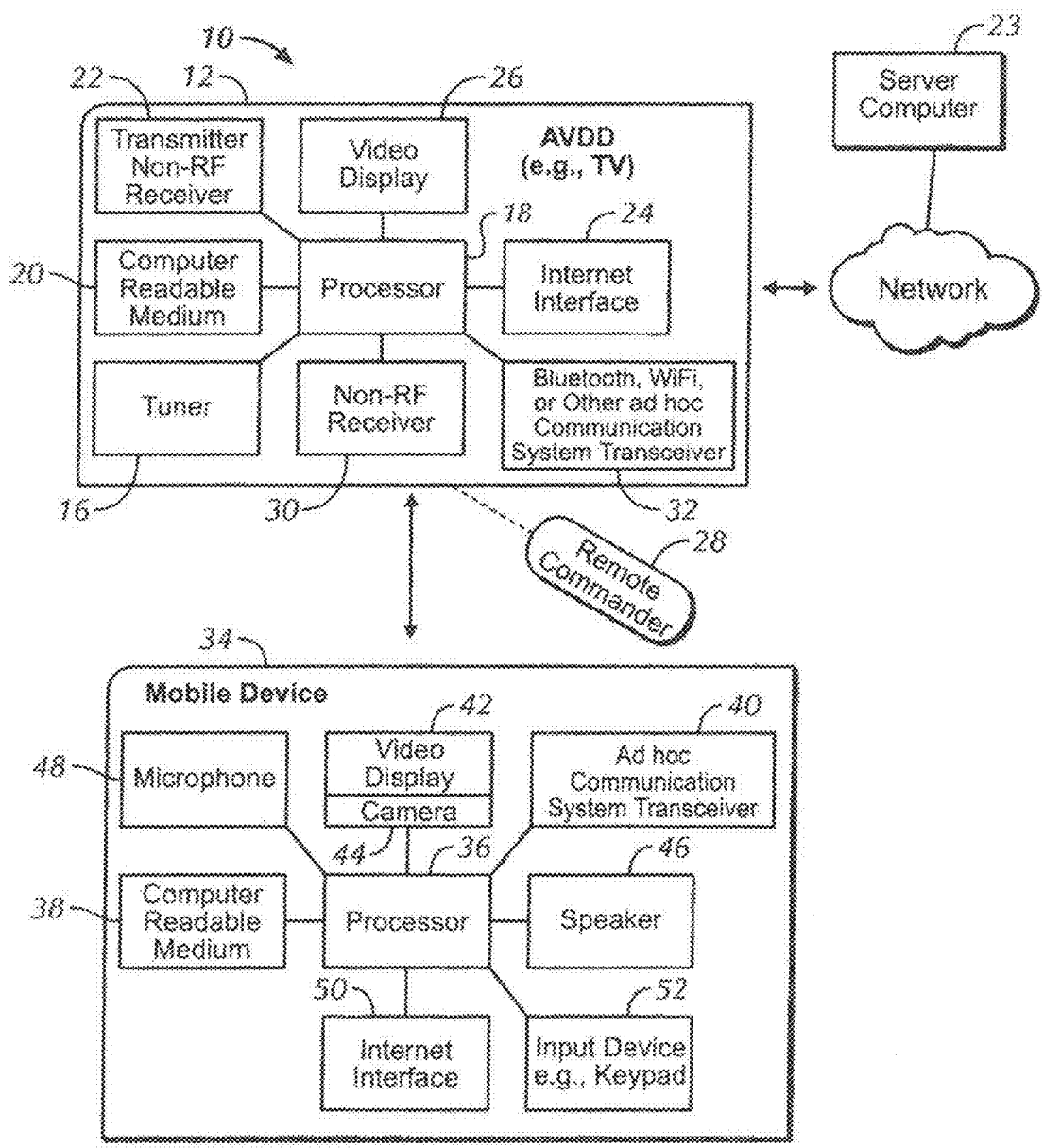
FIG. 1 is a block diagram of a non-limiting example system in accordance with present principles.

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more non-radiofrequency (non-RF) transmitters 22. When the below-described infrastructure-to-ad hoc mode signal is acoustic, the non-RF transmitters disclosed herein can be audio speakers. In other embodiments, the below-described infrastructure-to-ad hoc mode signal can be infrared (IR), in which case the non-RF transmitters can be, e.g., IR-emitting diodes or other IR-emitting light sources. Yet again, the below-described infrastructure-to-ad hoc mode signal can be visual, in which case the non-RF transmitters can be, e.g., visible barcodes that reflect visible light.

The AVDD 12 can receive streaming video, firmware updates, etc. from one or more servers 23 through the Internet as shows using a built-in wired or wireless network interface 24 (such as a modem or router) communicating with the processor 12 which may execute a software-implemented browser.

Video is presented under control of the TV processor 18 on a TV display 26 such as but not limited to a high definition TV (HDTV) flat panel display. The display 26 may be a three dimensional (3D) TV display that presents simulated 3D images to a person wearing 3D glasses watching the TV or otherwise, e.g., using holograms or other 3D technology. For example, the display 26 may be an autostereoscopic display, or active showered 3D glasses that the viewer wears to view a sequential display 26 is also contemplated.

User commands to the processor 18 may be wirelessly received from a remote control (RC) 28 using, e.g., rf or infrared. Audio-video display devices other than a TV may be used, e.g., smart phones, game consoles, personal digital organizers, notebook computers and other types of computers, etc.

TV programming from one or more terrestrial TV broadcast-sources as received by a terrestrial broadcast antenna which communicates with the AVDD 12 may be presented on the display 26 and receiver 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end may also be received at the TV for presentation of TV signals on the display 26 and speakers. When basic cable only is desired, the cable from the wall typically carries TV signals in QAM or NTSC format and is plugged directly into the "F-type connector" on the TV chassis in the U.S., although the connector used for this purpose in other countries may vary. In contrast, when the user has an extended cable subscription for instance, the signals from the head end are typically sent through a STB which may be separate from or integrated within the TV chassis but in any case which sends HDMI baseband signals to the TV when the source is external to the TV. Other types of corrections may be used, e.g., MOCA, USB, 1394 protocols, DLNA.

Similarly, HDMI baseband signals transmitted from a satellite source of TV broadcast signals received by so integrated receiver/decoder (IRD) associated with a home satellite dish may be input to a HDMI/CEC port of the AVDD 12 for presentation on the display 26 and speakers. Also, streaming video may be received from she internet for presentation on the display 26 and speakers. The streaming video may be received at the network interface 24 or it may be received at an in-home modem that is external to the AVDD 12 and conveyed to the AVDD 12 over a wired or wireless Ethernet link and received at an RJ45 or 802.11x antenna or the TV chassis.

Also, in some embodiments one or more non-RF receivers 30 may be connected to the processor 18 to provide to the processor 18 signals representing audible sounds input to the non-RF receiver 30. The non-RF receivers are complementary to the non-RF transmitters, such that when the below-described infrastructure-to-ad hoc mode signal is acoustic, the non-RF receivers disclosed herein can be audio sensors such as microphones. In other embodiment the below-described infrastructure-to-ad hoc mode signal can be infrared (IR), in which case the non-RF receivers can be, e.g., IR receivers. Yet again, the below-described infrastructure-to-ad hoc mode signal can be visual, in which case the non-RF receivers can be, e.g., imaging devices such as cameras that can image, e.g., bar codes for input thereof to the associated processor.

Recognizing that a visual infrastructure-to-ad hoc mode signal typically requires greater processing power to analyze, in preferred embodiments the infrastructure-to-ad hoc mode signal is either IR or acoustic, since relatively lower processing power can be used by the receiving device including, for example, the low power processor of a TV in the sleep mode.

The processor 18 may also communicate with an infrared (IR) or radio frequency (RF) transceiver 32 for establishing ad hoc communications with a mobile (MD) 34. The transceiver 32 may be, without limitation, a Bluetooth transceiver. The MD 34 may include a MSCD processor 36 accessing a computer readable storage medium 38 and communicating signals to and from the AVDD 12 through a communication interface 40 such as a transceiver configured to communicate with the transceiver 34 of the AVDD 12. The transceivers 32, 40 may be, without limitation, WiFi transceivers, Bluetooth transceivers, etc.

The MD 34 may also include a video display 42 that may be a touch screen display. The MD 34 may also have one or more cameras 44 communicating image information to the MSCD processor 36. Also, the MD 34 may include one or more non-RF transmitters such as audio signal generators such as but not limited to speakers 46 receiving signals from the processor 36 for audible display, a non-RF receiver such as a microphone 48 inputting signals to the processor 36 representing audible signals detected by the microphone 48, and a typically wireless Internet interface 50. As stated above, however, the non-RF receiver and transmitter may operate in the visual or IR spectrum. A user may input commands to the processor 36 using an input device 52 such as but not limited to a keypad. The MD 34 may be, without limitation, any portable device such as a smart phone, laptop or tablet computer, portable game console, camera, and the like.

In accordance with description set forth further below, in the embodiment that uses an audio infrastructure-to-ad hoc mode signal, the audio signals generated by the audio signal generator may be a tonal pattern that defines a period, and so a detecting device (such as the AVDD) can more easily determine if the tonal pattern satisfies a criterion such as whether it matches a prestored test pattern using signal averaging and autocorrelation. The tonal pattern cm be a telephone-like dual tone multi frequency (DTMF) pattern. Or, the tonal pattern can be a pseudo-random soft "noise" signal that sounds to a human like random noise such as a quiet chirp, but that, owing to its pseudo-random nature, is recognized by the receiving processor as a mode switch signal using autocorrelation principles.

Note that some communication systems may require a default service set identifier (SSID) or other network name and/or encryption keys. In such systems, a common default SSID and encryption key can be published to all device manufacturers and sent in the infrastructure-to-ad hoc mode signal to effect the mode switch.

While the above description discusses an AVDD and MD, present principles apply to mobile device to mobile device mode switching as well.

The ensuing discussion assumes that the infrastructure-to-ad hoc mode signal is acoustic. It is to be understood that the logic and UIs described below apply equally to IR and visible infrastructure-to-ad hoc mode signals mutatis mutandis.

Note that by "non-RF" is relative to the electromagnetic spectrum and as used herein means the electromagnetic spectrum defined by the visible and IR wavelengths, in addition to acoustic waves. Note further that by "ad hoc" and "infrastructure" mode is meant the modes described by IEEE 802.11. Briefly, a basic service set (BSS) is a set of all stations that can communicate with each other. There are two types of BSS: Independent BSS (also referred to as IBSS), and infrastructure BSS. Every BSS has an identification (ID) called the BSSID, which is the MAC address of the access point servicing the BSS. An independent BSS (IBSS) is an ad-hoc network that contains no access points, which means they cannot connect to any other basic service set. An infrastructure can communicate with other stations not in the same basic service set by communicating through access points. As ad hoc network is a network where stations communicate only peer to peer (P2P). There is no base and no one gives permission to talk.

Figure 2:
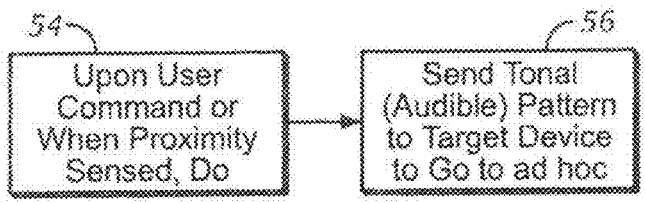
FIGS. 2-4 are flow charts illustrating example logic in accordance with present principles.

Moving in reference to FIG. 2, the processor 18 carries out an action in response to user selection or when proximity is sensed at block 54. The action earned out by the processor 18 may be to send a tonal (audible) pattern to a target device to go to a mode ad hoc at block 56. Alternatively, another non-RF signal such as an IR signal or visible wavelength signal may be sent according to present principles. However, for ease of disclosure the description below, which applies equally to other non-RF signal types, assumes an acoustic tonal signal is sent.

Figure 3:
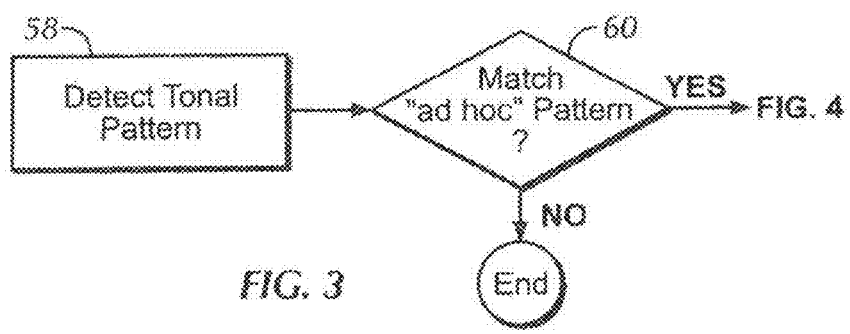

FIG. 3 illustrates the detection of tonal pattern by the processor 38 of the target device 34 at block 58. The processor 38 determines whether the tonal pattern is a match with a prestored pattern at decision diamond 60. If the tonal pattern detected at block 58 is not a match, the flow of logic ends. However, if fee tonal pastern does match the ad hoc pattern, the logic moves to FIG. 4.

Figure 4:
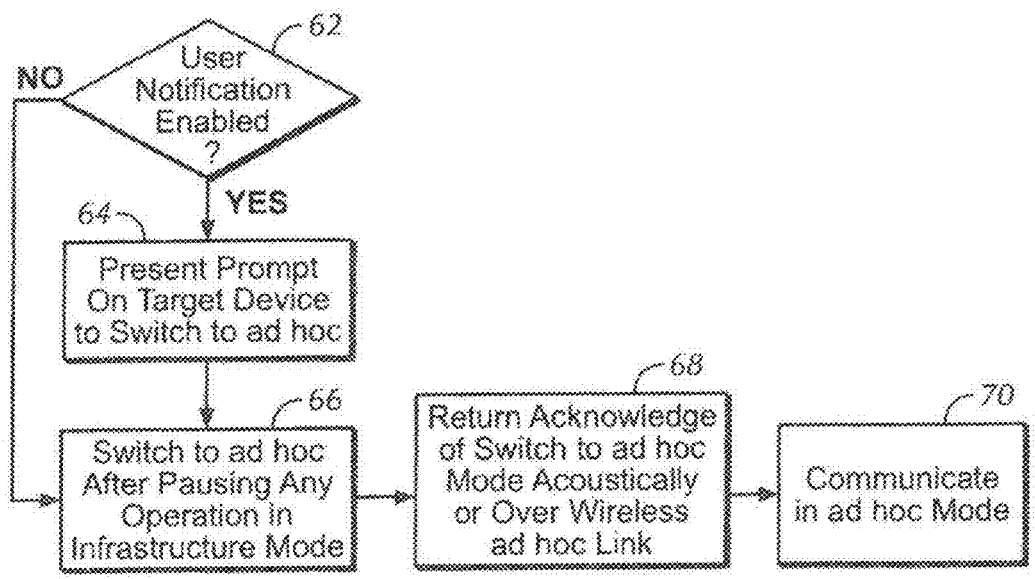

The logic diagram is FIG. 4 begins at decision diamond 62, at which point the processor 18 determines whether user notification is enabled. In the case of the user notification being enabled, the logic flows to block 64, where a prompt to switch to ad hoc mode is presented on the target device. If the user notification is not enabled at decision diamond 62, or once the user selects to switch to ad hoc mode at block 64, a switch to ad hoc after pausing any operation in infrastructure mode is carried oat at block 66.

An acknowledgement of the switch to ad hoc mode can be sent acoustically or over a wireless ad hoc link at block 68. The logic flows to block 70, at which point communication is performed in ad hoc mode.

Figure 5:
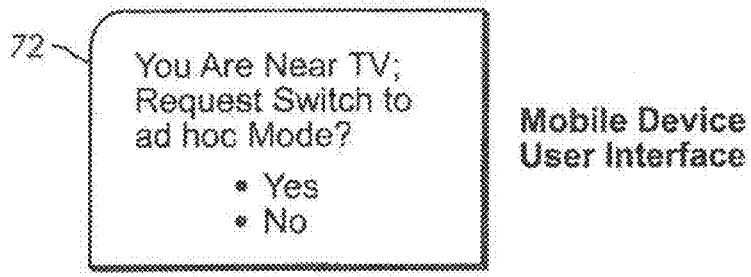
FIGS. 5-7 are screen shots illustrating various principles.

FIG. 5 illustrates art example UI 72 on the display 42 of the mobile device 34. In this embodiment, the UI 72 presents the user with the information of proximity so a TV and prompts the user to switch to an ad hoc mode. The user may select either "Yes" or "No."

Figure 6:
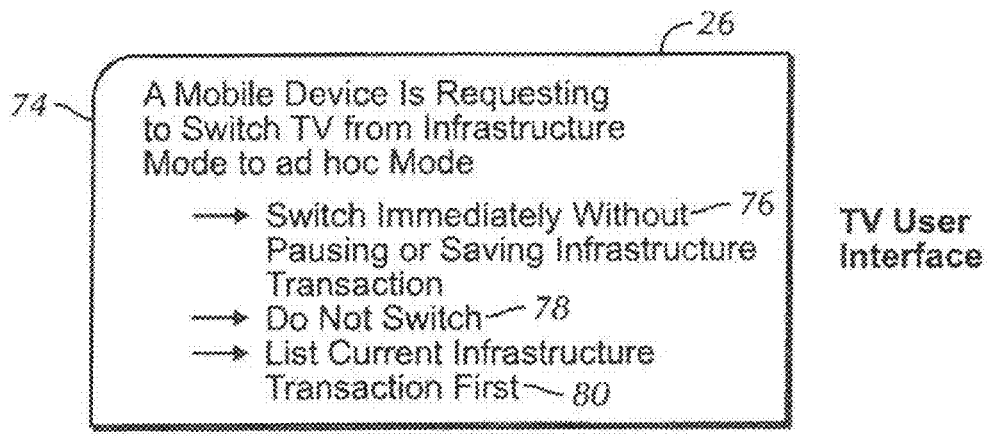

A UI 74, shows in FIG. 6, may also be presented on the video display 26 of the AVDD 12 responsive to selection of "yes" in FIG. 5. The user is presented with information that the mobile device 34 is requesting to switch the AVDD, a TV in this embodiment, from infrastructure mode to ad hoc mode at the top of the UI 74. The user of the AVDD 12 is also presented with plural selectable elements. A selectable element 76 if selected by a user switches the AVDD 12 to ad hoc mode immediately without saving or pausing the infrastructure transaction. The user may select element 78 to not switch to ad hoc or may select element 80 to list the current infrastructure transaction list.

Figure 7:
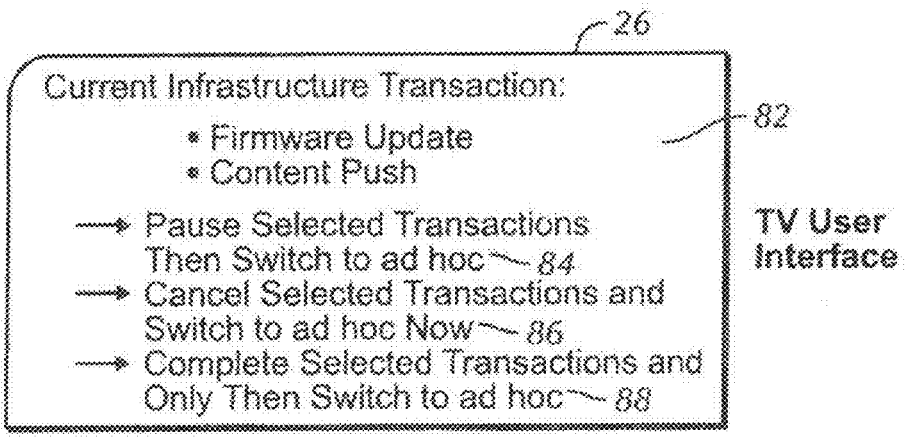

An infrastructure transaction list UI 82 is shown is FIG. 7 responsive to selection of the element 80 in FIG. 6. In this embodiment, the current infrastructure transactions are listed as "firmware update" and "content push." User selection of a selector element 84 pauses the current transactions and switches the device to ad hoc mode. The user may also elect to cancel the selected transactions and switch to ad hoc immediately by selecting element 86. A selection of the element 88 shown in FIG. 7 causes the selected transactions to be completed, only after which is the switch to ad hoc mode made.

While the particular ACOUSTIC SIGNALLING TO SWITCH FROM INFRASTRUCTURE COMMUNICATION MODE TO AD HOC COMMUNICATION MODE is herein shown and described in detail, it is so be understood that the subject matter which is encompassed by the present invention is limited only by the claims.

What is claimed is:

1. A method comprising:

using a first computerized device, communicating in an infrastructure mode and an ad hoc mode;

receiving, by the first communication device, from a second computerized device a non-RF signal indicating a request to enter the ad hoc mode to communicate thereby;

in response to the non-radiofrequency (RF) signal, switching to the ad hoc mode; and returning an audio acknowledgment of switching to the ad hoc mode to the second computerized device, wherein the non-RF signal includes an acoustic tonal pattern, and the method comprises entering the ad hoc mode by the first computerized device only responsive to a determination that the tonal pattern meets at least one predetermined criterion.

2. The method of claim 1, comprising using an audio video display device (AVDD) to execute the method.

3. The method of claim 2, wherein the AVDD includes a television.

4. The method of claim 1, wherein at least one of the computerized devices is a wireless telephone or a camera.

5. The method of claim 1, wherein the ad hoc mode is a Bluetooth communication mode.

6. The method of claim 1, wherein the criterion is a match with a test pattern.

7. The method of claim 1, wherein the non-RF signal is an infrared signal.

8. The method of claim 1, wherein the non-RF signal is a visible signal.

9. The method of claim 1, wherein the non-RF signal is sent only in response to a user input to send the non-RF signal signal.

10. The method of claim 1, wherein the non-RF signal is sent automatically without user intervention responsive to the second computerized device determining that the first computerized device is in ad hoc mode proximity to the second computerized device.

11. The method of claim 1, comprising, responsive to receiving the non-RF signal, presenting on the first computerized device a prompt to switch communication mode from an infrastructure mode to the ad hoc mode, and switching the first computerized device to the ad hoc mode in response to a user input, responsive to the prompt, to switch communication mode from the infrastructure mode to the ad hoc mode.

12. The method of claim 1, comprising, responsive to the first computerized device receiving the non-RF signal when in an infrastructure mode and prior to switching the first computerized device to the ad hoc mode, pausing at least one transaction being conducted by the first computerized device in the infrastructure mode, and then switching the first computerized device to the ad hoc mode to communicate with the second computerized device.

13. The method of claim 1, comprising, responsive to switching the first computerized to the ad hoc mode in response to receiving the non-RF signal, returning an RF acknowledgment to the second computerized device.

14. A method comprising:
communicating in an infrastructure mode;
receiving from a computerized device a signal indicating a request to enter an ad hoc mode to communicate thereby with the computerized device;
responsive to switching to the ad hoc mode in response to receiving the signal, returning an audio acknowledgment to the computerized device, wherein the signal indicating a request to enter an ad hoc mode includes an acoustic tonal pattern, and the method comprises entering the ad hoc mode only responsive to a determination that the tonal pattern meets at least one predetermined criterion.

15. The method of claim 14, wherein the computerized device is a wireless telephone or a camera.

16. The method of claim 14, wherein the signal indicating a request to enter an ad hoc mode includes an infrared signal.

17. The method of claim 14, wherein the signal indicating a request to enter an ad hoc mode signal includes a visible signal.

18. The method of claim 14, wherein the signal indicating a request to enter an ad hoc mode is sent only in response to a user input to send the audio signal.

19. System comprising:
first computerized device configured for communicating in an infrastructure mode and an ad hoc mode, the first computerized device comprising:
first processor;
first computer memory with instructions executable by the first processor;
first infrastructure mode communication interface; and
first ad hoc mode communication interface;
the instructions when executed by the first processor configuring the first processor to:
receive from a second computerized device a signal indicating a request for the first computerized device to enter the ad hoc mode to communicate thereby with the second computerized device;
present at least one human-perceptible user interface (UI) to facilitate switching communication mode from the infrastructure mode to the ad hoc mode, the at least one UI including information related to at least one current transaction involving the first computerized device in the infrastructure mode, wherein the at least one UI includes:
at least a first selector selectable to switch the first computerized device to ad hoc mode without saving or pausing the transaction.

20. The system of claim 19, wherein the at least one UI comprises at least a second selector selectable to list at least one current transaction in the infrastructure mode.

21. The system of claim 20, wherein the at least one UI comprises a list of at least one current transaction in the infrastructure mode.

22. The system of claim 21, wherein the at least one UI comprises at least a third selector selectable to pause the at least one transaction and switch the first computing device to ad hoc mode.

23. System comprising:
first computerized device configured for communicating in an infrastructure mode and an ad hoc mode, the first computerized device comprising:
first processor;
first computer memory with instructions executable by the first processor;
first infrastructure mode communication interface; and
first ad hoc mode communication interface;
the instructions when executed by the first processor configuring the first processor to:
receive from a second computerized device a signal indicating a request for the first computerized device to enter the ad hoc mode to communicate thereby with the second computerized device;
present at least one human-perceptible user interface (UI) to facilitate switching communication mode from the infrastructure mode to the ad hoc mode, the at least one UI including information related to at least one current transaction involving the first computerized device in the infrastructure mode, wherein the signal is an acoustic tonal pattern, and the instructions when executed by the first processor configure the first processor to enter the ad hoc mode only responsive to a determination that the tonal pattern meets at least one predetermined criterion.

* * * * *